United States Patent
De Gaudemaris et al.

(10) Patent No.: US 12,024,631 B2
(45) Date of Patent: Jul. 2, 2024

(54) CIVIL ENGINEERING VEHICLE TIRE

(71) Applicant: COMPAGNIE GENERALE DES ETABLISSEMENTS MICHELIN, Clermont-Ferrand (FR)

(72) Inventors: Benoit De Gaudemaris, Clermont-Ferrand (FR); Alain Hut, Clermont-Ferrand (FR); Laurent Petitjean, Clermont-Ferrand (FR)

(73) Assignee: COMPAGNIE GENERALE DES ETALISSEMENTS MICHELIN, Clermont-Ferrand (FR)

( * ) Notice: Subject to any disclaimer, the term of this patent is extended or adjusted under 35 U.S.C. 154(b) by 184 days.

(21) Appl. No.: 16/772,562

(22) PCT Filed: Dec. 13, 2018

(86) PCT No.: PCT/FR2018/053263
§ 371 (c)(1),
(2) Date: Jun. 12, 2020

(87) PCT Pub. No.: WO2019/115954
PCT Pub. Date: Jun. 20, 2019

(65) Prior Publication Data
US 2020/0392314 A1    Dec. 17, 2020

(30) Foreign Application Priority Data

Dec. 14, 2017    (FR) .................................. 1762102

(51) Int. Cl.
| | |
|---|---|
| *C08L 9/06* | (2006.01) |
| *B60C 1/00* | (2006.01) |
| *C08K 3/04* | (2006.01) |
| *C08K 5/01* | (2006.01) |
| *C08L 7/00* | (2006.01) |
| *B60C 11/00* | (2006.01) |
| *B60C 11/03* | (2006.01) |
| *C08L 25/06* | (2006.01) |
| *C08L 25/16* | (2006.01) |
| *C08L 97/02* | (2006.01) |

(52) U.S. Cl.
CPC .............. *C08L 9/06* (2013.01); *B60C 1/0016* (2013.01); *C08K 3/04* (2013.01); *C08K 5/01* (2013.01); *C08L 7/00* (2013.01); *B60C 2011/0033* (2013.01); *B60C 2011/0339* (2013.01); *B60C 2011/0353* (2013.01); *B60C 2011/0355* (2013.01); *C08K 2201/006* (2013.01); *C08L 25/06* (2013.01); *C08L 25/16* (2013.01); *C08L 97/02* (2013.01)

(58) Field of Classification Search
CPC .... C08L 9/06; C08L 7/00; C08K 5/01; C08K 3/04; B60C 1/0016; B60C 2011/0033; B60C 2011/0339; B60C 2011/0353; B60C 2011/0355
See application file for complete search history.

(56) References Cited

U.S. PATENT DOCUMENTS

| | | | |
|---|---|---|---|
| 3,393,182 A | 7/1968 | Trepka | |
| 4,644,988 A * | 2/1987 | Ahmad | ..................... C08K 3/04 |
| | | | 152/905 |
| 6,211,953 B1 * | 4/2001 | Niino | ..................... G01N 21/03 |
| | | | 356/246 |
| 6,221,953 B1 | 4/2001 | Sandstrom et al. | |
| 7,250,463 B2 | 7/2007 | Durel et al. | |
| 7,820,771 B2 | 10/2010 | Lapra et al. | |
| 8,950,454 B2 * | 2/2015 | Callamand | .......... B60C 11/0323 |
| | | | 152/902 |
| 9,616,715 B2 * | 4/2017 | Felder | ................. B60C 11/0311 |
| 9,670,291 B2 | 6/2017 | Marechal et al. | |
| 9,822,244 B2 * | 11/2017 | Joseph | ....................... C08L 9/00 |
| 10,214,638 B2 * | 2/2019 | Belin | .................... B60C 1/0016 |
| 10,308,080 B2 * | 6/2019 | De-Tullio | ........... B60C 11/1315 |
| 10,427,471 B2 * | 10/2019 | Nugier | .................. B60C 11/032 |
| 10,683,412 B2 | 6/2020 | Sun et al. | |
| 10,882,981 B2 | 1/2021 | Blok et al. | |
| 11,203,680 B2 * | 12/2021 | De Gaudemaris | ........ C08L 9/00 |

(Continued)

FOREIGN PATENT DOCUMENTS

| | | | | |
|---|---|---|---|---|
| CN | 106232703 A | 12/2016 | | |
| EP | 1035164 A1 | 9/2000 | | |
| FR | 3019548 A1 * | 10/2015 | ........... B60C 1/0016 |
| JP | 2015-38169 A * | 2/2015 | ................ C08L 9/00 |
| WO | 97/36724 A2 | 10/1997 | | |
| WO | 99/16600 A1 | 4/1999 | | |

(Continued)

OTHER PUBLICATIONS

JP 2015-38169 A (Feb. 26, 2015); machine translation. (Year: 2015).*
International Search Report dated Mar. 28, 2019, in corresponding PCT/FR2018/053263 (4 pages).
R. Mildenberg, et al., Hydrocarbon Resins, VCH, New York, chapter 5.5, pp. 141-146 (1997).

*Primary Examiner* — Rip A Lee
(74) *Attorney, Agent, or Firm* — VENABLE LLP

(57) ABSTRACT

The tread of a civil engineering vehicle tire comprises a rubber composition based on at least one elastomer matrix comprising from 50 to 100 phr of a styrene-butadiene copolymer and from 0 to 50 phr of isoprene elastomer; a reinforcing filler comprising predominantly carbon black with CTAB specific surface area greater than or equal to 90 $m^2/g$; from 1 to 30 phr of at least one hydrocarbon resin predominantly consisting of units derived from aromatic and cycloaliphatic monomers, having an aromatic proton content between 0 and 12%, an ethylenic proton content greater than 3%, a number-average molecular weight above 500 g/mol and a polydispersity index greater than 2; and a crosslinking system.

17 Claims, No Drawings

(56) References Cited

U.S. PATENT DOCUMENTS

| | | | |
|---|---|---|---|
| 11,365,308 B2* | 6/2022 | De Gaudemaris | C08L 21/00 |
| 11,535,058 B2* | 12/2022 | Goncalves | C08K 9/10 |
| 2005/0004297 A1 | 1/2005 | Durel et al. | |
| 2008/0132644 A1 | 6/2008 | Lapra et al. | |
| 2009/0270558 A1 | 10/2009 | Gandon-Pain et al. | |
| 2012/0252928 A1 | 10/2012 | Marechal et al. | |
| 2015/0065655 A1 | 3/2015 | Blok et al. | |
| 2017/0121509 A1 | 5/2017 | Belin et al. | |
| 2017/0198122 A1 | 7/2017 | Rodgers et al. | |
| 2017/0292013 A1 | 10/2017 | Blok et al. | |
| 2018/0037729 A1 | 2/2018 | Sun et al. | |
| 2018/0215905 A1 | 8/2018 | Mangeret | |
| 2018/0290489 A1* | 10/2018 | Mangeret | C08K 5/09 |
| 2018/0370287 A1* | 12/2018 | Mansuy | B60C 9/18 |
| 2019/0270341 A1* | 9/2019 | Spinnler | B60C 1/0016 |
| 2020/0131347 A1 | 4/2020 | Cabioch et al. | |
| 2020/0157322 A1* | 5/2020 | De Gaudemaris | C08K 3/04 |
| 2020/0190292 A1* | 6/2020 | De Gaudemaris | C08K 3/36 |
| 2020/0385550 A1 | 12/2020 | Cabioch et al. | |

FOREIGN PATENT DOCUMENTS

| | | | |
|---|---|---|---|
| WO | 03/016387 A1 | 2/2003 | |
| WO | 2006/069792 A1 | 7/2006 | |
| WO | 2006/069793 A1 | 7/2006 | |
| WO | 2011/042507 A1 | 4/2011 | |
| WO | 2015/150542 A1 | 10/2015 | |
| WO | 2016/043851 A1 | 3/2016 | |
| WO | 2016/053541 A1 | 4/2016 | |
| WO | 2017/017123 A1 | 2/2017 | |
| WO | 2017/060633 A1 | 4/2017 | |
| WO | WO 2017/060633 A1 * | 4/2017 | B60C 1/00 |
| WO | 2017/109400 A1 | 6/2017 | |
| WO | 2018/027020 A1 | 2/2018 | |

* cited by examiner

CIVIL ENGINEERING VEHICLE TIRE

BACKGROUND

The present invention relates to tyres intended for equipping civil engineering vehicles and having improved resistance to aggressive conditions and improved processability during manufacture.

In a known manner, a civil engineering vehicle tyre must withstand the very particular conditions of wear of these tyres. In fact, these tyres are subjected to very severe conditions, with many aggressive influences due to the terrains where they are used. Moreover, in particular for very large tyres, these tyres may encounter significant problems of internal heating, which may lead to degradation of the tyre. These particular wear conditions do not affect other types of tyres such as the tyres of passenger vehicles, heavy goods vehicles, or aircraft. In parallel, in contrast to passenger vehicle tyres for example, especially for large machines, civil engineering vehicle tyres must be able to support a load which may be extremely heavy. Consequently, the solutions known for other tyres are not directly applicable to civil engineering vehicle tyres.

The document WO2015/150542 describes compositions for tyres, for example of civil engineering vehicles, whose tread comprises a composition comprising an SBR elastomer, carbon black with a CTAB specific surface area greater than or equal to 90 $m^2/g$, and an aromatic dicyclopentadiene plasticizing resin. This composition makes it possible to improve the resistance of the compositions to the aggressive conditions encountered for example by a civil engineering vehicle tyre.

In parallel, tyre manufacturers are still interested in finding solutions for civil engineering vehicle tyres, allowing facilitated production of tyres notably by possible extrusion at higher temperature without initiating vulcanization. For this, the compositions must have a longer scorch time.

It was in this context that the applicant found that particular compositions of civil engineering vehicle tyre treads could have improved properties, in particular improved resistance to aggressive conditions, while increasing the scorch time of these compositions, and therefore allowing improved processability.

SUMMARY

Consequently, the invention relates to a civil engineering vehicle tyre whose tread comprises a rubber composition based on at least one elastomer matrix comprising from 50 to 100 phr of a styrene-butadiene copolymer and from 0 to 50 phr of isoprene elastomer; a reinforcing filler predominantly comprising carbon black with a CTAB specific surface area greater than or equal to 90 $m^2/g$; from 1 to 30 phr of at least one hydrocarbon resin predominantly consisting of units derived from aromatic and cycloaliphatic monomers, having an aromatic proton content between 0 and 12%, an ethylenic proton content greater than 3%, a number-average molecular weight above 500 g/mol and a polydispersity index greater than 2; and a crosslinking system.

DETAILED DESCRIPTION OF THE INVENTION

The expression "composition based on" means a composition comprising the mixture and/or the in-situ reaction product of the different basic constituents used, certain ones of these constituents being able to react and/or being intended to react with one another, at least partially, in the various steps of manufacture of the composition, or during subsequent curing, modifying of the composition as prepared initially. Thus, the compositions as employed for the invention may be different in the non-crosslinked state and in the crosslinked state.

Moreover, the term "phr" denotes, in the sense of the present patent application, parts by weight per hundred parts of elastomers, in a way familiar to a person skilled in the art.

Unless expressly stated otherwise, all the percentages (%) indicated herein are percentages (%) by weight. Furthermore, any range of values denoted by the expression "between a and b" represents the range of values from more than a to less than b (i.e. excluding the limits a and b) whereas any range of values denoted by the expression "from a to b" signifies the range of values from a up to b (i.e. including the strict limits a and b). When a range of values is denoted herein by the expression "from a to b", this also and preferably denotes the range represented by the expression "between a and b".

When reference is made to a "predominant" compound, this means, in the sense of the present invention, that this compound is predominant among the compounds of the same type in the composition, i.e. it represents the largest amount by weight among the compounds of the same type. Thus, for example, a predominant polymer is the polymer representing the greatest weight relative to the total weight of the polymers in the composition. In the same way, a filler that is said to be predominant is the one representing the greatest weight among the fillers in the composition. As an example, in a system comprising a single polymer, the latter is predominant in the sense of the present invention; and in a system comprising two polymers, the predominant polymer represents more than half of the weight of the polymers. In contrast, a "minor" compound is a compound that does not represent the greatest fraction by weight among the compounds of the same type. Preferably, "predominant" means present at more than 50%, preferably more than 60%, 70%, 80%, 90%, and more preferably the "predominant" compound represents 100%.

Moreover, when reference is made to a "predominant" unit (or monomer) within one and the same compound (or polymer), this means, in the sense of the present invention, that this unit (or monomer) is predominant among the units (or monomers) forming the compound (or polymer), i.e. it represents the greatest fraction by weight among the units (or monomers) forming the compound (or polymer). Thus, for example, a resin predominantly consisting of units derived from dicyclopentadiene monomers, and aromatic units, is a resin in which the dicyclopentadiene units added to the aromatic units represent the greatest amount by weight, among all the units making up said resin. In other words, a "predominant" monomer or a "predominant" set of monomers is a monomer (or a set of monomers) that represents the greatest fraction by weight in the polymer. Conversely, a "minor" monomer is a monomer that does not represent the greatest mole fraction in the polymer.

The compounds mentioned in the description may be of fossil origin or may be biosourced. In the latter case, they may be derived partially or completely from biomass or obtained from renewable raw materials derived from biomass. This relates notably to polymers, plasticizing agents, fillers, etc.

Unless stated otherwise, the components described herein form part of the composition of the civil engineering vehicle tyre tread according to the present invention. Their respective levels of incorporation correspond to their levels in the tread composition of the civil engineering vehicle tyre according to the present invention.

The civil engineering vehicle tyre of the invention has a tread comprising a composition based on at least one elastomer matrix comprising from 50 to 100 phr of a styrene-butadiene copolymer and from 0 to 50 phr of isoprene elastomer; a reinforcing filler predominantly comprising carbon black with a CTAB specific surface area greater than or equal to 90 m$^2$/g; from 1 to 30 phr of at least one hydrocarbon resin predominantly consisting of units derived from aromatic and cycloaliphatic monomers, having an aromatic proton content between 0 and 12%, an ethylenic proton content greater than 3%, a number-average molecular weight above 500 g/mol and a polydispersity index greater than 2; and a crosslinking system.

Elastomer Matrix

According to the invention, the elastomer matrix comprises from 50 to 100 phr of a styrene-butadiene copolymer and from 0 to 50 phr of isoprene elastomer.

Butadiene-styrene copolymers and isoprene elastomers are diene elastomers that are familiar to a person skilled in the art.

The elastomers used in the context of the present invention may be for example of the block, random, sequenced or microsequenced type, and may be prepared in dispersion or in solution; they may be coupled and/or star-branched and/or functionalized with a coupling agent and/or star-branching agent and/or functionalizing agent.

In the sense of the present invention, a styrene-butadiene copolymer is any copolymer obtained by copolymerization of one or more butadienes with one or more styrenes. These elastomers may have any microstructure, depending on the polymerization conditions used, notably on the presence or absence of a modifying and/or randomizing agent and on the amounts of modifying and/or randomizing agent used. The elastomers may be for example of the block, random, sequenced or microsequenced type, and may be prepared in dispersion or in solution.

"Isoprene elastomer" means, in a known manner, a homopolymer or a copolymer of isoprene, in other words a diene elastomer selected from the group consisting of natural rubber (NR), the synthetic polyisoprenes (IR), the various isoprene copolymers and the mixtures of these elastomers. Among the isoprene copolymers, we may mention in particular the isobutene-isoprene (butyl rubber—IIR), isoprene-styrene (SIR), isoprene-butadiene (BIR) or isoprene-styrene-butadiene (SBIR) copolymers. This isoprene elastomer is preferably natural rubber or a synthetic cis-1,4 polyisoprene, preferably natural rubber. For example, the synthetic polyisoprene may be a polyisoprene having a level (mol%) of cis-1,4 bonds greater than 90%, even more preferably greater than 98%.

The isoprene elastomer may be selected from the group comprising natural rubber, synthetic polyisoprene and a mixture thereof. Preferably, the isoprene elastomer is natural rubber.

The styrene-butadiene copolymer is preferably a styrene-butadiene (SBR) random copolymer. It may be for example an SBR prepared in emulsion ("ESBR") or an SBR prepared in solution ("SSBR"). The contents of (-1,2), trans-1,4 and cis-1,4 vinyl bonds of the butadiene part of the SBR may be variable. For example, the vinyl content may be between 15% and 80% (mol%), and the content of trans-1,4 bonds between 15% and 80% (mol%).

Preferably, the styrene-butadiene copolymer is a styrene-butadiene copolymer with a low level of styrene. The level of styrene may preferably be within a range from 5 to 45%, preferably from 10 to 35%, more preferably from 15 to 30%.

Preferably, the styrene-butadiene copolymer is functionalized with tin (Sn), i.e. comprises C-Sn bonds (also called Sn functionalization). It may be functionalized simply (C-Sn bonds at chain end) and/or coupled (Sn atom between two chains) and/or star-branched (Sn atom between 3 chains or more) with a functionalizing and/or coupling and/or star-branching agent. Generally all these elastomers bound to tin are grouped together and called tin-functionalized elastomers. These elastomers are known by a person skilled in the art, for example those described in document WO 2011/042507. Other types of functionalization exist for butadiene and styrene copolymers, such as silanol functional groups or polysiloxane having a silanol end, or else the epoxidized styrene-butadiene copolymers. Such functionalizations are also possible in the context of the present invention.

Preferably, according to the invention, the level of styrene-butadiene copolymer is in a range from 70 to 100 phr, and the level of isoprene elastomer is in a range from 0 to 30 phr. More preferably, the level of styrene-butadiene copolymer is in a range from 70 to 90 phr, and the level of isoprene elastomer is in a range from 10 to 30 phr.

In a preferred embodiment of the present invention, the total content of styrene-butadiene copolymer and isoprene elastomer is in a range from 50 to 100 phr, preferably from 75 to 100 phr.

More preferably, the total content of styrene-butadiene copolymer and isoprene elastomer is 100 phr. In other words, according to this embodiment, the elastomer matrix of the composition of the civil engineering vehicle tyre tread according to the invention comprises exclusively isoprene elastomer and styrene-butadiene copolymer.

In cases when the total content of isoprene elastomer and styrene-butadiene copolymer is different from 100 phr, the invention comprises another elastomer in addition to the isoprene elastomer and the styrene-butadiene copolymer. For this reason, any type of elastomer known by a person skilled in the art is usable.

Reinforcing Filler

According to the invention, the composition of the civil engineering vehicle tyre tread comprises a reinforcing filler predominantly comprising carbon black called "fine", i.e. having a CTAB specific surface area greater than or equal to 90 m$^2$/g. The CTAB specific surface area is determined according to French standard NF T 45-007 of November 1987 (method B).

Among the latter, we may mention more particularly the reinforcing carbon blacks of series 100, 200 (ASTM grades), for example such as the blacks N115, N134, N234. Of course, a blend of two carbon blacks having the aforementioned characteristics is suitable for the invention.

Blacks having a so-called "low" structure, i.e. having a COAN index below 95 ml/g, may also be suitable. It should be noted that the index of absorption of oil by compressed specimens of carbon black (COAN) is a measure of the capacity of the carbon black to absorb liquid.

This property is itself a function of the structure of the carbon black. The COAN index is determined using standard ISO 4656/2012 by means of an absorptiometer, with compressed specimens of carbon black.

It should be noted that the carbon blacks could for example already be incorporated in the SBR or in the NR if applicable, notably isoprene in the form of a masterbatch, carried out by a dry or liquid route (see for example applications WO 97/36724 or WO 99/16600).

The carbon black may advantageously represent the only reinforcing filler in the composition.

According to a variant embodiment of the invention, the carbon black having the aforementioned CTAB specific surface area may be used blended with another minor reinforcing filler at a level preferably between 1 and 10 phr. This other reinforcing filler may consist of any type of so-called reinforcing filler, known for its ability to reinforce a rubber composition usable for tyre manufacture.

For example, another organic filler such as another carbon black, organic fillers of functionalized polyvinylaromatic as described in applications WO-A-2006/069792 and WO-A-2006/069793, an inorganic reinforcing filler such as silica, with which a coupling agent is associated in a known manner, or else a mixture of these different fillers.

Thus, "inorganic filler" is to be understood here, in a known manner, as any inorganic or mineral filler, whatever its colour and its origin (natural or synthetic), also called "white filler", "clear filler", or "non-black filler", as opposed to carbon black, this inorganic filler being capable of reinforcing on its own, without any means other than an intermediate coupling agent, a rubber composition intended for manufacturing a tyre tread, in other words able to replace, in its reinforcement function, a conventional carbon black of tyre tread grade. Such a filler is generally characterized by the presence of functional groups, notably hydroxyl (OH), on its surface, requiring, for use as reinforcing filler, the use of a coupling agent or system intended to provide a stable chemical bond between the isoprene elastomer and said filler.

An inorganic filler of this kind may therefore be used with a coupling agent to allow reinforcement of the rubber composition in which it is included. It may also be used with a coating agent (which does not provide a bond between the filler and the elastomer matrix), whether or not supplementing a coupling agent (in this case the inorganic filler does not perform the role of reinforcement).

The physical state of the inorganic filler is unimportant, whether it is in the form of powder, microbeads, granules, beads or any other suitable densified forms. Of course, "inorganic filler" also means mixtures of different inorganic fillers, in particular of highly dispersible siliceous and/or aluminous fillers as described hereunder.

Notably mineral fillers of the siliceous type, in particular silica ($SiO_2$), or of the aluminous type, in particular alumina ($Al_2O_3$), are suitable as inorganic fillers. The silica used may be any silica known by a person skilled in the art, notably any precipitated silica or fumed silica having a BET surface area and a CTAB specific surface area both below 450 $m^2/g$, preferably from 30 to 400 $m^2/g$. As highly dispersible precipitated silicas (called "HDS"), we may mention for example the "Ultrasil 7000" and "Ultrasil 7005" silicas from the company Evonik, the "Zeosil 1165MP, 1135MP and 1115MP" silicas from the company Rhodia, the "Hi-Sil EZ150G" silica from the company PPG, the "Zeopol 8715, 8745 and 8755" silicas from the company Huber, and the silicas with high specific surface area as described in application WO 03/16837.

The BET specific surface area is determined in a known manner by adsorption of gases by the Brunauer-Emmett-Teller method described in "The Journal of the American Chemical Society" Vol. 60, page 309, February 1938, more precisely according to French standard NF ISO 9277 of December 1996 (multipoint (5-point) volumetric method—gas: nitrogen—degassing: 1 hour at 160° C.—range of relative pressure p/po: 0.05 to 0.17).

We may also envisage adding, to the specific carbon black of the composition, carbon blacks covered partially or completely with silica in a post-treatment, or the carbon blacks modified in situ with silica such as, but not limited to, the fillers marketed by the company Cabot Corporation under the name Ecoblack™ "CRX 2000" or "CRX4000".

Preferably, the total level of filler (carbon black and other fillers if applicable) is between 20 and 100 phr.

The carbon black according to the invention is present at a level ranging from 20 to 90 phr, more preferably from 30 to 80 phr and even more preferably from 45 to 65 phr.

Plasticizing Resin

According to the invention, the composition of the civil engineering vehicle tyre tread comprises from 1 to 30 phr of a plasticizing resin predominantly consisting of units derived from aromatic and cycloaliphatic monomers, this resin having an aromatic proton content between 0 and 12%, an ethylenic proton content greater than 3%, a number-average molecular weight above 500 g/mol and a polydispersity index greater than 2. This resin is also called aromatic/cycloaliphatic resin hereinafter.

The plasticizing resins in general are familiar to a person skilled in the art. They are also sometimes called hydrocarbon resins or resins with high glass transition temperature.

In a manner known by a person skilled in the art, the designation "plasticizing resin" is reserved in the present application, by definition, for a compound that is solid at room temperature (23° C.) (in contrast to a liquid plasticizing compound such as an oil).

The hydrocarbon resins are polymers that are familiar to a person skilled in the art, naturally miscible in the compositions of diene elastomer(s) when they are further qualified as "plasticizing agents". They are described for example in the work titled "*Hydrocarbon Resins*" by R. Mildenberg, M. Zander and G. Collin (New York, VCH, 1997, ISBN 3-527-28617-9), chapter 5 of which deals with their applications, notably in rubber tyre manufacture (5.5. "*Rubber Tires and Mechanical Goods*"). They may be aliphatic, aromatic or also of the aliphatic/aromatic type, i.e. based on aliphatic and/or aromatic monomers. They may be natural or synthetic, whether or not based on petroleum (if that is the case, they are also known as petroleum resins). They are preferably exclusively hydrocarbon-containing, i.e. they only comprise carbon and hydrogen atoms, but may also comprise some heteroatoms and notably oxygen atoms depending on the monomers included in their composition.

The specific resin for the invention consists predominantly of units derived from aromatic and cycloaliphatic monomers.

Cycloaliphatic monomers are understood, according to the present invention and conventionally for a person skilled in the art, as the saturated cyclic monomers, and the monomers will preferably be selected from the group consisting of cyclopentadiene (abbreviated to CPD), dicyclopentadiene (abbreviated to DCPD), the substituted derivatives of these monomers, such as methylcyclopentadiene (abbreviated to MCPD) and mixtures thereof. More preferably, the cycloaliphatic monomers are selected from the group consisting of cyclopentadiene (abbreviated to CPD), dicyclopentadiene (abbreviated to DCPD), methylcyclopentadiene (abbreviated to MCPD) and mixtures thereof.

The monomers derived from a C9 petroleum cut will preferably be selected as aromatic monomers, preferably those selected from the group consisting of styrene, alpha-methylstyrene, vinyl toluene, indene and mixtures thereof.

Thus, preferably, the hydrocarbon resin predominantly consisting of units derived from aromatic and cycloaliphatic monomers is such that the cycloaliphatic monomers are selected from the group consisting of cyclopentadiene, dicyclopentadiene, methylcyclopentadiene and mixtures thereof, and the aromatic monomers are selected from the group consisting of styrene, alpha-methylstyrene, vinyl toluene, indene and mixtures thereof.

The resin useful for the requirements of the invention, predominantly consisting of units derived from aromatic and cycloaliphatic monomers, may comprise, in addition to these units, and as minor components, aliphatic units, i.e. based on aliphatic monomers, other than the cycloaliphatic monomers. For this reason, the resin may comprise, as a minor component, units derived from olefinic monomers. Similarly, the resin may also comprise units derived from the derivatives of pine, preferably selected from the group consisting of alpha-pinene, beta-pinene, rosin, turpentine, tall oil and mixtures thereof. The resin may optionally be modified with maleic anhydride.

The aromatic/cycloaliphatic resin has an aromatic proton content between 0 and 12%, preferably an aromatic proton content in a range from 1 to 10%, preferably from 2 to 7%.

The aromatic/cycloaliphatic resin has an ethylenic proton content greater than 3%, preferably an ethylenic proton content in a range from 3 to 7%.

According to a preferred embodiment, the hydrocarbon resin useful for the requirements of the invention has a glass transition temperature (Tg) in a range from 30° C. to 150° C., preferably from 30 to 120° C.

The hydrocarbon resin useful for the requirements of the invention has a number-average molecular weight (Mn) above 500 g/mol, preferably in a range from 500 g/mol to 1500 g/mol and preferably from 500 to 1000 g/mol.

The hydrocarbon resin useful for the requirements of the invention has a polydispersity index (PDI) greater than 2, preferably in a range from 2 to 5, and preferably from 3 to 4.5.

According to a preferred embodiment of the invention, the hydrocarbon resin predominantly consisting of units derived from aromatic and cycloaliphatic monomers further comprises units derived from the derivatives of pine, preferably selected from the group consisting of alpha-pinene, beta-pinene, rosin, turpentine, tall oil and mixtures thereof. According to this preferred embodiment, the resin is also preferably modified with maleic anhydride.

A great many hydrocarbon resins are available commercially. These resins may have characteristics, notably of chemical composition, Tg, Mn, aromatic proton content, ethylenic proton content or PDI that differ depending on the supplier. Table 1 below proposes a selection of commercially available resins predominantly consisting of units derived from aromatic and cycloaliphatic monomers, with their main characteristics.

TABLE 1

| Resin referenes | | | | NMR: % protons | | | DSC | SEC | | | |
|---|---|---|---|---|---|---|---|---|---|---|---|
| Ref example | Trade name | Supplier | Chemical nature | Arom. | Ethylenic | Aliph. | Tg | Mn | Mw | Mz | PDI |
| Resin 1 | Quintone 1105 | Nippon Zeon | DCPD | 0 | 10 | 90 | 56 | 380 | 891 | 2479 | 2.3 |
| Resin 2 | Novares TC100 (TACARKLE) | Rutgers | DCPD-Arom | 16 | 5 | 79 | 42 | 484 | 883 | 1731 | 1.8 |
| Resin 3 | Quintone 1920 | Nippon Zeon | DCPD-Arom | 8 | 7 | 85 | 65 | 485 | 1095 | 2561 | 2.3 |
| Resin 4 | Novares TC160 (THER DCPAR) | Rutgers | DCPD-Arom | 13 | 5.6 | 81.4 | 106 | 725 | 2047 | 5096 | 2.8 |
| Resin 5 | Quintone 2940 | Nippon Zeon | DCPD-Arom | 8 | 7 | 85 | 77 | 558 | 1381 | 3594 | 2.5 |
| Resin 6 | LX-2161 | Neville | DCPD-Arom | 10 | 5 | 85 | 69 | 678 | 1975 | 5227 | 2.9 |
| Resin 7 | LX-1200 130 | Neville | DCPD-Arom | 7 | 5 | 88 | 60 | 660 | 1879 | 4870 | 2.8 |
| Resin 8 | Nevroz 1420 | Neville | DCPD-Arom (*) | 3 | 5 | 92 | 90 | 913 | 3539 | 10584 | 3.9 |
| Resin 9 | LX-1035 | Neville | DCPD-Arom | 7 | 5 | 88 | 102 | 824 | 3207 | 9720 | 3.9 |

(*) further comprising units derived from pine derivatives

It can be seen from Table 1 that resins 1 to 4 are not suitable for the invention, whereas resins 5 to 9 are usable.

The glass transition temperature Tg is measured in a known manner by DSC (Differential Scanning Calorimetry), according to standard ASTM D3418 (1999).

The macrostructure (Mw, Mn, PDI and Mz) of the hydrocarbon resin is determined by size exclusion chromatography (SEC) on the basis of standards ISO 16014 (Determination of average molecular mass and molecular mass distribution of polymers using size exclusion chromatography), ASTM D5296 (Molecular Weight Averages and molecular weight distribution of polystyrene by high-performance size exclusion chromatography), and DIN 55672 (size exclusion chromatography).

For these measurements, the resin sample is dissolved in non-antioxidized tetrahydrofuran to a concentration of 1.5 g/l. The solution is filtered with a Teflon filter with a porosity of 0.45 μm, for example using a disposable syringe fitted with a filter. A volume of 100 μl is injected through a set of size exclusion chromatography columns. The mobile phase is eluted at a flow rate of 1 ml/min. The columns are thermostatically controlled in a furnace at 35° C. Detection is by means of a refractometer thermostatically controlled to 35° C. The stationary phase of the columns is based on a gel of divinylbenzene polystyrene of controlled porosity. The polymer chains are separated according to the size that they occupy when they are dissolved in the solvent: the larger the volume that they occupy, the less the pores of the columns are accessible to them and the shorter their elution time.

A Moore calibration curve relating the logarithm of the molecular weight (logM) to the elution time (te) is carried out beforehand with polystyrene standards, and modelled with a polynomial of order 3: Log (molecular weight of polystyrene)=a+b te+c te2+d te3.

Polystyrene standards with narrow molecular distributions (polydispersity index, PDI, less than or equal to 1.1) are used for the calibration curve. The range of molecular weights of these standards is from 160 to about 70 000 g/mol. These standards may be grouped in "families" of 4 or 5 standards having an increment of about 0.55 of log M between each.

Kits of certified standards (ISO 13885 and DIN 55672) may be used, for example such as kits of vials from the company PSS (Polymer Standard Service, reference PSS-pskitr1l-3), as well as a PS supplementary standard with MW=162 g/mol (Interchim, reference 178952). These kits are in the form of 3 vials each containing a family of polystyrene standards in suitable quantities:

Black vial: MW=1220, 4850, 15 500 and 67 500 g/mol.
Blue vial: MW=376, 3470, 10 400, 46 000 g/mol.
Yellow vial: MW=266, 1920, 7200, 28 000 g/mol.
PS162: MW=162 g/mol.

The number-average molecular weight (Mn), weight-average molecular weight (Mw), Mz, and the polydispersity of the resin analysed are calculated from this calibration curve. This is why we use the term molecular weights relative to polystyrene calibration.

For calculating the average molecular weights and PDI, the limits of integration of elution of the product are defined on the chromatogram corresponding to sample injection. The refractometric signal defined between the 2 limits of integration is "cut out" every second. The elution time ti and the area of the signal of the detector Ai are recorded for each of the "elementary cuts".

It will be recalled here that: PDI=Mw/Mn, with Mw being the weight-average molecular weight, and Mn the number-average molecular weight. It will also be recalled that the molecular weights Mw, Mn and Mz are average molecular weights calculated from the following formulae:

$$MZ = \frac{\Sigma Ai * Mi^2}{\Sigma Ai * Mi}$$

$$Mn = \frac{\Sigma Ai}{\Sigma \frac{Ai}{Mi}}$$

$$Mw = \frac{\Sigma Ai * Mi}{\Sigma Ai}$$

in which Ai is the amplitude of the signal from the refractometric detector corresponding to the molecular weight Mi and the elution time ti.

The equipment used for SEC measurement is a liquid chromatography chain, for example the Alliance 2690 chain from WATERS comprising a pump, a degasser and an injector; a differential refractometer (for example the 2410 refractometer from WATERS), data acquisition and processing software, for example the EMPOWER software from WATERS, a column furnace, for example the WATERS "columns Heater Module" and 4 columns mounted in series in the following order:

| Number | Make | Molecular weight range (g/mol) | Length (mm) | Inside diameter (mm) | Particle size (μm) | Trade name | References (as a guide) |
|---|---|---|---|---|---|---|---|
| Columns 1 and 2 | Polymer Laboratories | 200-400000 | 300 | 7.5 | 5 | MIXED-D | PL1110-6504 |
| Columns 3 and 4 | Polymer Laboratories | 200-30000 | 300 | 7.5 | 3 | MIXED-E | PL1110-6300 |

The aromatic proton content (%HA) and the ethylenic proton content (%HE) are measured by $^1$H NMR. This determination is performed for all of the signals detected. Thus, the results obtained are expressed in % of peak area.

The samples are dissolved in deuterated chloroform ($CDCl_3$) at a rate of about 10 mg of resin in about 1 mL of solvent. The spectra are acquired on an Advance 500 MHz Bruker spectrometer equipped with a "wide band" probe BBO z-grad 5 mm Bruker. The $^1$H NMR experiment uses a single pulse sequence 30° and a repetition delay of 5 seconds between each acquisition. 64 accumulations are performed at room temperature. The chemical shifts are calibrated relative to the protonated impurity of the deuterated chloroform; δppm 1 H at 7.20 ppm. The $^1$H NMR signals of the aromatic protons are located between 8.5 ppm and 6.2 ppm. The ethylenic protons generate signals between 6.2 ppm and 4.5 ppm. Finally, the signals corresponding to the aliphatic protons are located between 4.5 ppm and 0 ppm. The areas of each category of protons are referred to the sum of these areas, thus giving a distribution in percentage area of each category of protons.

The level of aromatic/cycloaliphatic resin is preferably in a range from 2 to 30 phr, more preferably from 2 to 15 phr.

Below the minimum indicated, the intended technical effect may prove insufficient, whereas above the upper limit, the compromise of properties required for the rubber composition in question is no longer achieved.

Preferably for the invention, the composition of the civil engineering vehicle tyre tread of the invention does not comprise any resin other than the specific resin described above.

Alternatively, the composition may additionally comprise another plasticizing agent, such as another plasticizing resin and/or a plasticizing oil at a level less than or equal to 15 phr, preferably less than or equal to 10 phr.

Crosslinking System

According to the invention, the composition of the civil engineering vehicle tyre tread comprises a crosslinking system.

The crosslinking system may be based either on sulphur, or sulphur donors and/or peroxide and/or bismaleimides. The crosslinking system is preferably a vulcanization system, i.e. a system based on sulphur (or a sulphur-donating agent) and a primary vulcanization accelerator. Various known secondary vulcanization accelerators or vulcanization activators such as zinc oxide, stearic acid or equivalent compounds, guanidine derivatives (in particular diphenylguanidine), or also known vulcanization retarders, will be added to this basic vulcanization system, incorporated during the first non-productive phase and/or during productive phase, as described hereunder.

Sulphur may be used at a preferred level between 0.5 and 12 phr, in particular between 1 and 10 phr. The primary vulcanization accelerator is used at a preferred level between 0.5 and 10 phr, more preferably between 0.5 and 5.0 phr.

Various Additives

The rubber composition may also comprise some or all of the usual additives regularly employed in the compositions of elastomers intended for tyre treads, for example such as

Civil Engineering Vehicle Tyres

The present invention relates to tyres intended for use on civil engineering vehicles.

These vehicles may be construction site machinery, dumpers, and machinery for strip mining or underground mining.

These tyres usually have diameters that may range from 1 to 4 metres, and are inflated to a working pressure above 4 bar, notably above 6 bar, for example from 4 to 10 bar. Civil engineering machines are equipped with tyres which as a general rule are subjected to very large loads and wide variations of load.

Preferably, the civil engineering vehicle tyre according to the invention has a diameter in a range from 20 to 63 inches, preferably from 35 to 63 inches.

These tyres are provided with treads that have large thicknesses of rubber material, relative to the thicknesses of the treads of other types of tyres, for example such as tyres for heavy goods vehicles. Here, "large thickness" means a thickness above 30 mm and up to a value of 120 mm. Consequently, the effect of the rolling cycles and cycles of variations of load supported induce high temperatures in the treads of these tyres, notably in the central part of the treads.

As is known, a tyre notably comprises a tread whose running surface is sculpted with a plurality of grooves delimiting elements in relief (blocks, ribs) so as to generate ridges of material as well as hollows. These grooves represent a volume of hollows which, relative to the total volume of the tread (including both the volume of elements in relief and that of all the grooves) is expressed by a percentage denoted herein by "proportion of hollows by volume". A proportion of hollows by volume equal to zero indicates a tread without grooves or hollows.

Preferably, the civil engineering vehicle tyre according to the invention has one or more grooves whose average depth is in a range from 15 to 120 mm, preferably from 65 to 120 mm.

Also preferably, the civil engineering vehicle tyre according to the invention has an average proportion of hollows by volume on the whole tread within a range from 5 to 40%, preferably from 5 to 25%.

Preparation of the Rubber Compositions

The compositions used in the civil engineering vehicle tyre treads of the invention may be produced in suitable mixers, using two successive steps of preparation according to a general procedure familiar to a person skilled in the art: a first step of thermomechanical working or kneading (sometimes described as the "non-productive" step) at high temperature, up to a maximum temperature between 130° C. and 200° C., preferably between 145° C. and 185° C., followed by a second step of mechanical working (sometimes described as the "productive" step) at lower temperature, typically below 120° C., for example between 60° C. and 100° C., a finishing step during which the chemical crosslinking agent, in particular the vulcanization system, is incorporated.

The tyre tread composition according to the invention may be either in the raw state (before crosslinking or vulcanization), or in the cured state (after crosslinking or vulcanization), may be a semi-finished product that may be used in a tyre, notably in a tyre tread.

The aforementioned features of the present invention, as well as others, will be better understood on reading the description given hereunder of several non-limiting embodiment examples of the invention, given for purposes of illustration.

EMBODIMENT EXAMPLES OF THE INVENTION

Measurements and Tests Used

Scorch Time

The measurements are carried out at 130° C., according to French standard NF T 43-005. The variation of the consistometric index as a function of time makes it possible to determine the scorch time of the rubber compositions, assessed according to the aforementioned standard by the parameter T5 (in the case of a large rotor), expressed in minutes, and defined as the time taken to obtain an increase in the consistometric index (expressed in UM) of 5 units above the minimum value measured for this index.

Tensile Tests

These tests make it possible to determine the elastic strains and the properties at break; those performed on the cured mixtures are carried out according to standard AFNOR-NF-T46-002 of September 1988.

The elongations at break (in %) are measured at 23° C., in normal conditions of relative humidity (50% relative humidity), according to French standard NF T 40-101 (December 1979), the breaking stresses (in MPa) and the energy at break; the energy at break being the product of the breaking stress and the elongation at break. The results are given with a base of 100, i.e. the values are expressed relative to a control, whose elongation at break is regarded as the reference at 100. Similarly for the breaking stress and the energy at break.

Tearability

The tearability indices are measured at 23° C. Notably the force to be exerted to obtain fracture (FRD, in N/mm) is determined, and the strain at break (DRD, in %) is measured on a test specimen of dimensions 10×85×2.5 mm notched at the centre of its length with 3 notches to a depth of 5 mm, to cause rupture of the test specimen. Thus, it is possible to determine the energy to cause rupture (Energy) of the test specimen, which is the product of FRD and DRD. The results are given based on 100, i.e. the values are expressed relative to a control, whose measured value is regarded as the reference at 100.

Preparation of the Compositions, and Their Properties

The compositions C1 to C5, and the control compositions T1 to T4 whose formulation in phr is shown in Table 2, were prepared as follows.

An internal mixer (final filling level: about 70 vol %), with an initial tank temperature of about 80° C., is charged successively with the elastomers, the reinforcing filler, the hydrocarbon resin as well as the various other ingredients apart from the vulcanization system. Then thermomechanical working (non-productive phase) is carried out in one step, with a total duration of about 3 to 4 min, until a maximum "drop" temperature of 165° C. is reached. The mixture thus obtained is recovered, it is cooled and then sulphur and an accelerator of the sulphamide type are incorporated in a mixer (homo-finisher) at 70° C., mixing the whole (productive phase) for a suitable time (for example about ten minutes).

The compositions thus obtained are then calendered either in the form of plates (thickness 2 to 3 mm) or thin sheets of rubber for measurement of their physical or mechanical properties, or extruded in the form of a tyre tread.

EXAMPLES

These examples aim to show the effect of incorporating the specific hydrocarbon resin of the invention in compositions of tyre treads for civil engineering vehicles on the equilibrium of performance between resistance to aggressive conditions on the one hand, as represented by the average of all the performance indices for breaking force, breaking strain, energy at break, tearability force, tearability stress and tearability energy; and processability on the other hand, as represented by the scorch time (Ti) of the compositions. The average of the average of the properties of rupture/tearability and the scorch performance is representative of the equilibrium between the performance of resistance to aggressive conditions and processability.

Table 1 shows all of the compositions tested, and Table 2 shows the results obtained. T1 to T4 are control compositions, and C1 to C5 are the compositions according to the invention.

The results for performance in elongation at break at 23° C. and at 100° C. are expressed as a percentage with a base of 100 relative to the control composition, and similarly for the results for performance in resistance to tearability at 23° C. and at 100° C. The processability is represented by the values of Mooney viscosity in Mooney units.

TABLE 2

| Composition | T1 | T2 | T3 | T4 | C1 | C2 | C3 | C4 | C5 |
|---|---|---|---|---|---|---|---|---|---|
| SBR (1) | 80 | 80 | 80 | 80 | 80 | 80 | 80 | 80 | 80 |
| NR (2) | 20 | 20 | 20 | 20 | 20 | 20 | 20 | 20 | 20 |
| N115 (3) | 55 | 55 | 55 | 55 | 55 | 55 | 55 | 55 | 55 |
| Resin 1 (4) | 18 | — | — | — | — | — | — | — | — |
| Resin 2 (4) | — | 18 | — | — | — | — | — | — | — |
| Resin 3 (4) | — | — | 18 | — | — | — | — | — | — |
| Resin 4 (4) | — | — | — | 18 | — | — | — | — | — |
| Resin 5 (4) | — | — | — | — | 18 | — | — | — | — |
| Resin 6 (4) | — | — | — | — | — | 18 | — | — | — |
| Resin 7 (4) | — | — | — | — | — | — | 18 | — | — |
| Resin 8 (4) | — | — | — | — | — | — | — | 18 | — |
| Resin 9 (4) | — | — | — | — | — | — | — | — | 18 |
| 6PPD (5) | 1.5 | 1.5 | 1.5 | 1.5 | 1.5 | 1.5 | 1.5 | 1.5 | 1.5 |
| Stearic acid | 0.5 | 0.5 | 0.5 | 0.5 | 0.5 | 0.5 | 0.5 | 0.5 | 0.5 |
| ZnO | 2.0 | 2.0 | 2.0 | 2.0 | 2.0 | 2.0 | 2.0 | 2.0 | 2.0 |
| Accelerator (6) | 1.3 | 1.3 | 1.3 | 1.3 | 1.3 | 1.3 | 1.3 | 1.3 | 1.3 |
| Sulphur | 1.3 | 1.3 | 1.3 | 1.3 | 1.3 | 1.3 | 1.3 | 1.3 | 1.3 |

(1) SSBR with 27% styrene, 24% of polybutadiene 1-2 units and 46% of polybutadiene 1-4 trans units (Tg = −48° C.)
(2) Natural rubber plasticized to 58 Mooney from the company TSR
(3) Carbon black of grade N115 according to standard ASTM D-1765
(4) Resins 1 to 9 in Table 1
(5) N-1,3-dimethylbutyl-N-phenylparaphenylenediamine "Santoflex 6-PPD" from the company Flexsys-Solutia
(6) N-cyclohexyl-2-benzothiazyl sulphenamide "Santocure CBS" from the company Flexsys-Solutia

TABLE 3

| Composition | T1 | T2 | T3 | T4 | C1 | C2 | C3 | C4 | C5 |
|---|---|---|---|---|---|---|---|---|---|
| Elongation at break | 101 | 97 | 100 | 100 | 99 | 100 | 95 | 92 | 93 |
| Strain at break | 40 | 91 | 69 | 100 | 85 | 124 | 119 | 107 | 131 |
| Energy at break | 41 | 88 | 69 | 100 | 85 | 124 | 112 | 99 | 121 |
| DRD | 79 | 128 | 93 | 100 | 124 | 56 | 91 | 118 | 138 |
| FRD | 34 | 92 | 67 | 100 | 84 | 153 | 153 | 102 | 173 |
| Tearability energy | 27 | 118 | 62 | 100 | 104 | 86 | 140 | 120 | 237 |
| Average of rupture/tearability properties | 54 | 102 | 77 | 100 | 97 | 107 | 118 | 106 | 149 |
| Scorch time (Ti) | 81 | 65 | 109 | 100 | 122 | 115 | 120 | 153 | 121 |
| Average of rupture/tearability properties and Ti | 67 | 84 | 93 | 100 | 109 | 111 | 119 | 130 | 135 |

Taken together, the results show that the compositions according to the invention are better than all of the control compositions, T4 being the best control, whose performance was regarded as the base of 100.

The invention claimed is:

1. A civil engineering vehicle tire having a tread comprising a rubber composition based on at least:
   an elastomer matrix comprising from 70 to 90 phr of a styrene-butadiene copolymer and from 10 to 30 phr of an isoprene elastomer;
   a reinforcing filler predominantly comprising carbon black with a CTAB specific surface area greater than or equal to 90 m²/g;
   from 1 to 30 phr of one or two hydrocarbon resins predominantly consisting of units derived from aromatic and cycloaliphatic monomers, having an aromatic proton content between 0 and 12%, an ethylenic proton content greater than 3%, a number-average molecular weight above 500 g/mol and a polydispersity index greater than 2; and
   a crosslinking system,
   wherein the tread of the civil engineering vehicle tire has a thickness of greater than 30 mm and less than or equal to 120 mm,
   wherein the tread has one or more grooves, the average depth of which is in a range from 65 to 120 mm, and
   wherein the civil engineering vehicle tire has an average proportion of hollows by volume on the whole tread within a range from 5 to 40%.

2. The civil engineering vehicle tire according to claim 1, wherein the styrene-butadiene copolymer has a styrene content within a range from 5 to 45%.

3. The civil engineering vehicle tire according to claim 1, wherein the isoprene elastomer is selected from the group consisting of natural rubber, synthetic polyisoprene and a mixture thereof.

4. The civil engineering vehicle tire according to claim 1, wherein the isoprene elastomer is natural rubber.

5. The civil engineering vehicle tire according to claim 1, wherein a total content of styrene-butadiene copolymer and isoprene elastomer is in a range from 50 to 100 phr.

6. The civil engineering vehicle tire according to claim 1, wherein a total content of styrene-butadiene copolymer and isoprene elastomer is 100 phr.

7. The civil engineering vehicle tire according to claim 1, wherein an amount of carbon black is in a range from 20 to 90 phr.

8. The civil engineering vehicle tire according to claim 7, wherein the amount of carbon black is in a range from 45 to 65 phr.

9. The civil engineering vehicle tire according to claim 1, wherein the reinforcing filler consists of carbon black.

10. The civil engineering vehicle tire according to claim 1, wherein the cycloaliphatic monomers are selected from the group consisting of cyclopentadiene, dicyclopentadiene, methylcyclopentadiene and mixtures thereof, and the aromatic monomers are selected from the group consisting of styrene, alpha-methylstyrene, vinyl toluene, indene and mixtures thereof.

11. The civil engineering vehicle tire according to claim 1, wherein the one or two hydrocarbon resins have an aromatic proton content in a range from 1 to 10%.

12. The civil engineering vehicle tire according to claim 1, wherein the one or two hydrocarbon resins have has an ethylenic proton content in a range from greater than 3 to less than or equal to 7%.

13. The civil engineering vehicle tire according to claim 1, wherein the one or two hydrocarbon resins have a glass transition temperature in a range from 30° C. to 150° C.

14. The civil engineering vehicle tire according to claim 1, wherein the one or two hydrocarbon resins have a number-average molecular weight Mn in a range from 500 g/mol to 1500 g/mol.

15. The civil engineering vehicle tire according to claim 1, wherein the one or two hydrocarbon resins have a polydispersity index within a range from 2 to 5.

16. The civil engineering vehicle tire according to claim 1, wherein the one or two hydrocarbon resins further comprise units derived from pine derivatives.

17. The civil engineering vehicle tire according to claim 1, wherein the civil engineering vehicle tire has a diameter in a range from 20 to 63 inches.

* * * * *